(12) United States Patent
Ando et al.

(10) Patent No.: US 6,269,732 B1
(45) Date of Patent: Aug. 7, 2001

(54) PNEUMATIC BOOSTER

(75) Inventors: Hiromi Ando, Yamanashi-ken; Mitsuhiro Endo, Kanagawa-ken; Atsuya Koshu, Yamanashi-ken, all of (JP)

(73) Assignee: Tokico Ltd., Kawasaki (JP)

( * ) Notice: Subject to any disclaimer, the term of this patent is extended or adjusted under 35 U.S.C. 154(b) by 0 days.

(21) Appl. No.: 09/418,510

(22) Filed: Oct. 15, 1999

(30) Foreign Application Priority Data

Oct. 15, 1998 (JP) .................................................. 10-309432

(51) Int. Cl.[7] ....................................................... F15B 9/10
(52) U.S. Cl. ............................................................ 91/376 R
(58) Field of Search ................................. 91/376 R, 374, 91/369.2

(56) References Cited

U.S. PATENT DOCUMENTS 5,651,300   7/1997   Ikeda et al. ......................... 91/376 R

FOREIGN PATENT DOCUMENTS 8-67239   3/1996   (JP) .

*Primary Examiner*—Edward K. Look
*Assistant Examiner*—Michael Leslie
(74) *Attorney, Agent, or Firm*—Wenderoth, Lind & Ponack, L.L.P.

(57) ABSTRACT

A pneumatic booster includes a valve mechanism for introducing atmospheric air into a variable-pressure chamber in accordance with the movement of a plunger, propelling a power piston due to differential pressure generated between the variable-pressure chamber and a constant-pressure chamber and transmitting force by which the power piston is propelled through a valve body to an output shaft. The valve mechanism includes a poppet valve mechanism including a seal surface capable of abutting against an annular atmospheric valve seat formed in the plunger and a seal surface capable of abutting against an annular negative pressure valve seat formed on an inner surface of the valve body. The annular atmospheric valve seat of the plunger is located in a position forward in a direction of propelling of the power piston relative to the negative pressure valve seat and is substantially aligned with the negative pressure valve seat in an axial direction. The poppet valve mechanism has a main poppet valve including the seal surface capable of abutting against the negative pressure valve seat and a sub poppet valve including the seal surface capable of abutting against the atmospheric valve seat. The seal surface of the sub poppet valve is spaced apart in the axial direction from the seal surface of the main poppet valve.

4 Claims, 4 Drawing Sheets

PNEUMATIC BOOSTER

BACKGROUND OF THE INVENTION

The present invention relates to a pneumatic booster which is used in a brake system for a vehicle.

In many vehicles, use is made of a brake system comprising: a pneumatic booster for boosting a depressing force applied to a brake pedal; a master cylinder for generating a fluid pressure in accordance with an output of the pneumatic booster; and a disk brake which receives the fluid pressure from the master cylinder by means of a piston within a caliper and generates a predetermined braking force. Conventionally, for larger vehicles, a tandem type pneumatic booster having two power pistons arranged in tandem is employed in the brake system, because a tandem type pneumatic booster is capable of generating a high output. In recent years, however, study has been made of using a single-type pneumatic booster having a single power piston, with a view to reducing the size of a brake system.

In order to enable the use of a single-type pneumatic booster, it is necessary to increase a ratio of a pressure-receiving area of a cylinder within the caliper in the disk brake to a pressure-receiving area of the master cylinder. That is, efficiency of the master cylinder must be increased by reducing the diameter of the master cylinder to a level which is as low as possible. However, when a single-type pneumatic booster is applied simply by reducing the diameter of the master cylinder, the amount of fluid for operating the disk brake becomes insufficient. This insufficiency of the amount of fluid can be compensated for by increasing the stroke in each of the master cylinder and the pneumatic booster. However, when the stroke in the pneumatic booster is increased, the stroke of the brake pedal is also increased. This lowers brake operability. Therefore, in order to ensure the same brake operability as obtained in conventional brake systems, it is necessary to reduce a pedal ratio (a ratio of a distance between a pivot for the brake pedal and a point at which an input force is applied to a distance between the pivot and a point at which an output is obtained).

When the pedal ratio becomes small, the depressing force applied to the brake pedal becomes large. As a measure for preventing such an increase in the depressing force, it is known to increase a fluid force for advancing a plunger in the booster, which force is generated due to a difference between negative pressure and positive pressure acting on the booster. However, no effective mechanisms have been developed to increase the above-mentioned fluid force.

SUMMARY OF THE INVENTION

In view of the above, the present invention has been made. It is an object of the present invention to provide a pneumatic booster which generates a large fluid force for advancing a plunger therein so as to reduce a resistance thrust force at the time of depressing the brake pedal, and therefore can be easily applied even when the stroke in the booster is large.

The pneumatic booster of the present invention comprises a shell body, a power piston dividing an interior of the shell body into a constant-pressure chamber and a variable-pressure chamber, a valve body supported by the power piston and a plunger provided within the valve body. In order to achieve the above-mentioned object, an annular atmospheric valve seat at an end portion of the plunger which portion is connected to an input shaft has a larger diameter than that of a plunger in a conventional pneumatic booster. The atmospheric valve seat is located in a position forward in a direction of propelling of the power piston relative to a negative pressure valve seat. The atmospheric valve seat is positioned so as to substantially correspond with the negative pressure valve seat in an axial direction. In other words, the atmospheric valve seat is positioned so as to radially overlap the negative pressure valve seat. In a poppet valve mechanism including seal surfaces capable of abutting against the above-mentioned valve seats, the seal surfaces are spaced apart from each other in the axial direction.

By this arrangement, since the atmospheric valve seat of the plunger is larger in diameter than that in a conventional pneumatic booster, a fluid force generated due to a differential pressure acting on the plunger becomes large, thereby reducing a resistance thrust force at the time of depressing the brake pedal. Further, since the atmospheric valve seat and the negative pressure valve seat are spaced apart from each other in the axial direction, a sufficient flow path area can be ensured, so that the plunger can be advanced and returned without any delay.

DETAILED DESCRIPTION OF THE INVENTION

In order to facilitate explanation of the present invention, description of a known pneumatic booster will first be made, with reference to FIGS. 4 and 5.

Figure 4:
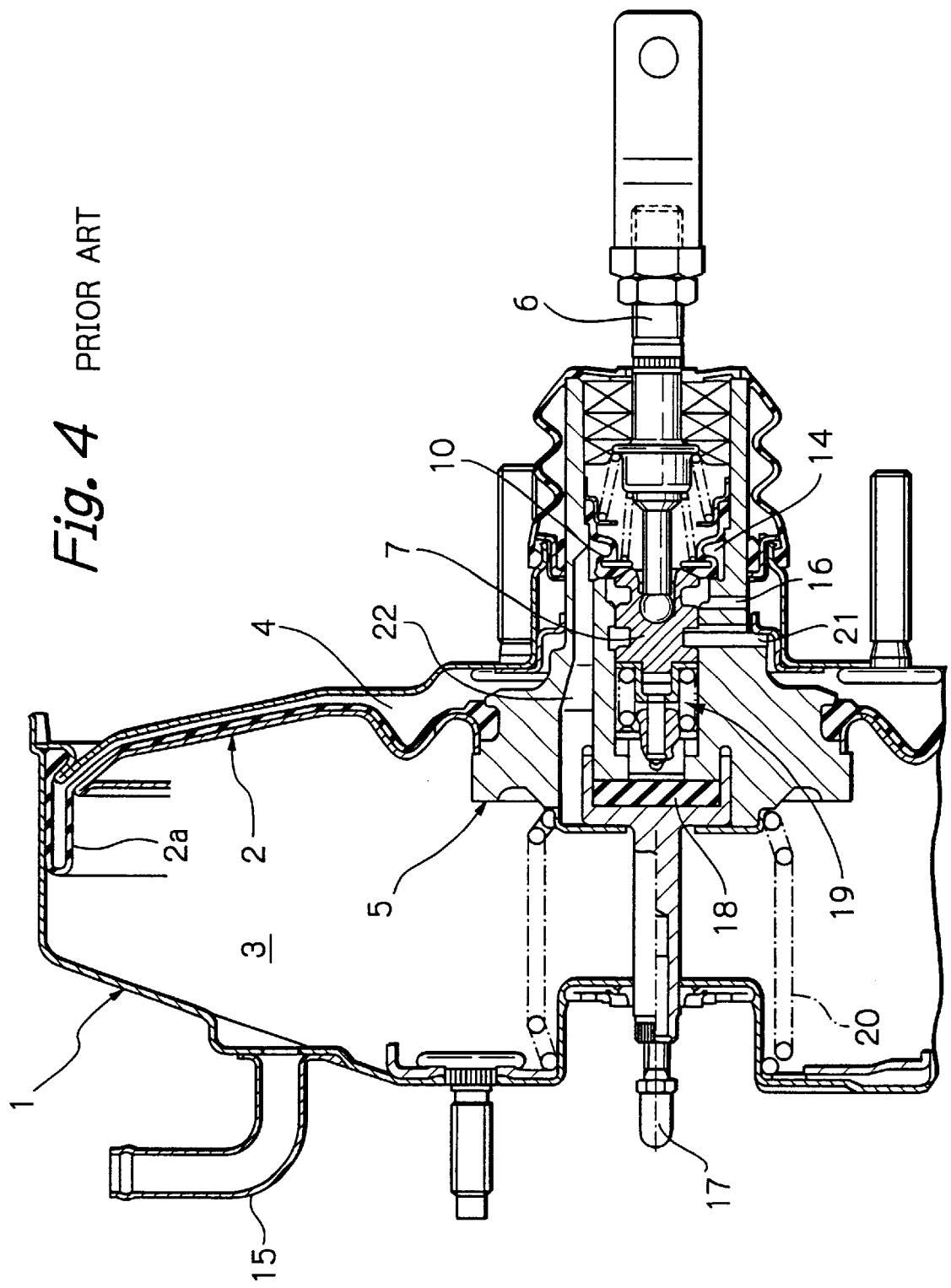
FIG. 4 is a cross-sectional view showing a general structure of a known single-type pneumatic booster.
Figure 5:
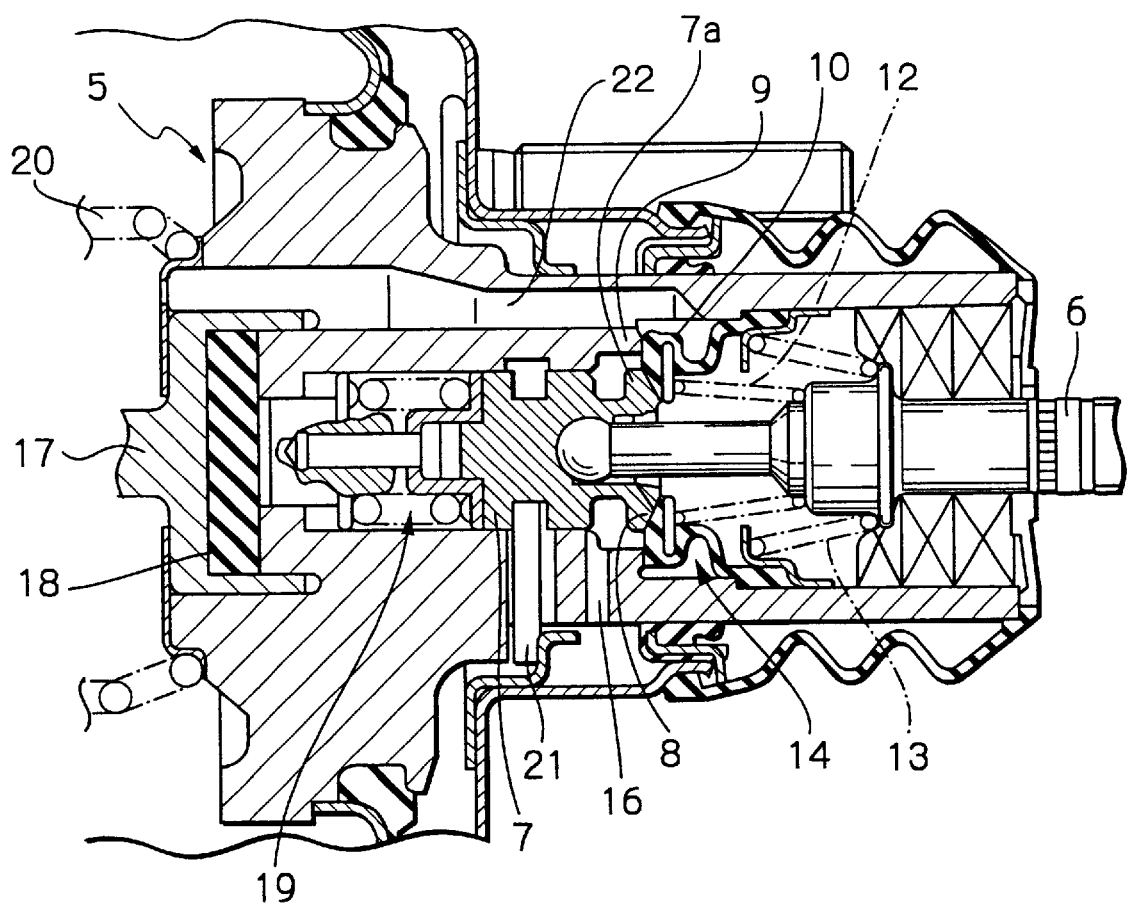
FIG. 5 is a cross-sectional view showing a structure of an essential part of the known single-type pneumatic booster.

As shown in FIGS. 4 and 5, a known single-type pneumatic booster generally comprises: a shell body 1; a power piston 2 having a diaphragm 2a and dividing an interior of the shell body 1 into a constant-pressure chamber 3 and a variable-pressure chamber 4; a valve body 5 supported by the power piston 2; and a valve mechanism 14 provided within the valve body 5. The valve mechanism 14 comprises: a plunger 7 connected to an input shaft 6 extending from a brake pedal; a poppet valve 10 separably seated on an annular atmospheric valve seat 8 formed at an end portion of the plunger 7, which portion is connected to the input shaft 6, and also separably seated on an annular negative pressure valve seat 9 formed on an inner surface of the valve body 5; a valve spring 12 having one end engaged with the input shaft 6 and normally biasing the poppet valve 10 in a direction for enabling the poppet valve 10 to be seated on the valve seats 8 and 9; and a return spring 13 having one end engaged with the valve body 5 and normally biasing the input shaft 6 in a return direction.

In this pneumatic booster, a negative pressure from an engine is supplied to the constant-pressure chamber 3 through a supply pipe 15 which is generally connected to a front portion of the shell body 1. When the input shaft 6 moves (or advances) in a leftward direction as viewed in the drawings in accordance with a depressing force applied to the brake pedal, the plunger 7 connected to the input shaft 6 also advances, so that the atmospheric valve seat 8 of the valve mechanism 14 moves away from the poppet valve 10, to thereby open an atmospheric valve and introduce atmospheric air into the variable-pressure chamber 4 through a radial passage 16 formed in the valve body 5. In this instance, the poppet valve 10 abuts against the negative pressure valve seat 9, to thereby close a negative pressure valve. Consequently, a differential pressure is generated between the constant-pressure chamber 3 supplied with the negative pressure and the variable-pressure chamber 4, to thereby propel the power piston 2. The force by which the power piston 2 is propelled is transmitted through the valve body 5 to an output shaft 17 and further transmitted to a master cylinder (not shown). An output reaction force at this time is partially transmitted to the plunger 7 (and the input shaft 6) through a reaction disk 18 provided between the valve body 5 and the output shaft 17 and a reaction force adjusting mechanism 19 provided within the valve body 5.

When the depressing force on the brake pedal is removed, the input shaft 6 and the plunger 7 retract as a unit due to a force of the return spring 13 of the valve mechanism 14, so that the atmospheric valve seat 8 abuts against the poppet valve 10, to thereby close the atmospheric valve. On the other hand, the poppet valve 10 moves away from the negative pressure valve seat 9, to thereby open the negative pressure valve. Consequently, the negative pressure in the constant-pressure chamber 3 is supplied from an axial passage 22 formed in the valve body 5 through the radial passage 16 to the variable-pressure chamber 4, so that the above-mentioned differential pressure is removed. Thereafter, when the brake pedal is completely released, due to the effect of a force of a return spring 20, the power piston 2 and the valve body 5 return to an inoperative state as shown in the drawings. The plunger 7 also returns and is held at its initial position by a stop key 21 which is radially inserted into the valve body 5.

That is, in an inoperative state of the booster, negative pressure and atmospheric pressure, respectively, act on a back side (on a side of the output shaft 17) and a front side (on a side of the input shaft 6) of the atmospheric valve seat 8 of the plunger 7. Due to the differential pressure between the back side and the front side of the atmospheric valve seat 8, a pulling force $F_{PR}$ acts on the plunger 7 in a direction of the output shaft 17. On the other hand, the input shaft 6 receives a return force as a resultant force of a set load $F_{BS}$ of the valve spring 12 and a set load $F_{RS}$ of the return spring 13. Therefore, at the start of depressing the brake pedal, a resistance thrust force ($=F_{BS}+F_{RS}-F_{PR}$) obtained by subtracting the pulling force ($F_{PR}$) from the return force ($F_{BS}+F_{RS}$) exists.

Therefore, when the pedal ratio is made small in accordance with an increase in the stroke in each of the master cylinder and the pneumatic booster, the resistance thrust force must be reduced to a level which is as low as possible. In other words, the force generated due to the differential pressure acting on the atmospheric valve seat 8 of the plunger 7 must be increased to a level as high as possible by increasing the diameter of the atmospheric valve seat 8.

However, in the above-mentioned known single-type pneumatic booster in which the atmospheric valve seat 8 and the negative pressure valve seat 9 are substantially flush with each other in a coaxial relationship, a certain limitation is imposed on increasing the diameter of a flange 7a of the plunger 7, because a predetermined flow path area must be ensured in a radial space between the valve seats 8 and 9. Therefore, it is extremely difficult to reduce the resistance thrust force, thus making it difficult to replace a tandem type pneumatic booster in a brake system with a single-type pneumatic booster.

Hereinbelow, an embodiment of the present invention is described.

Figure 1:
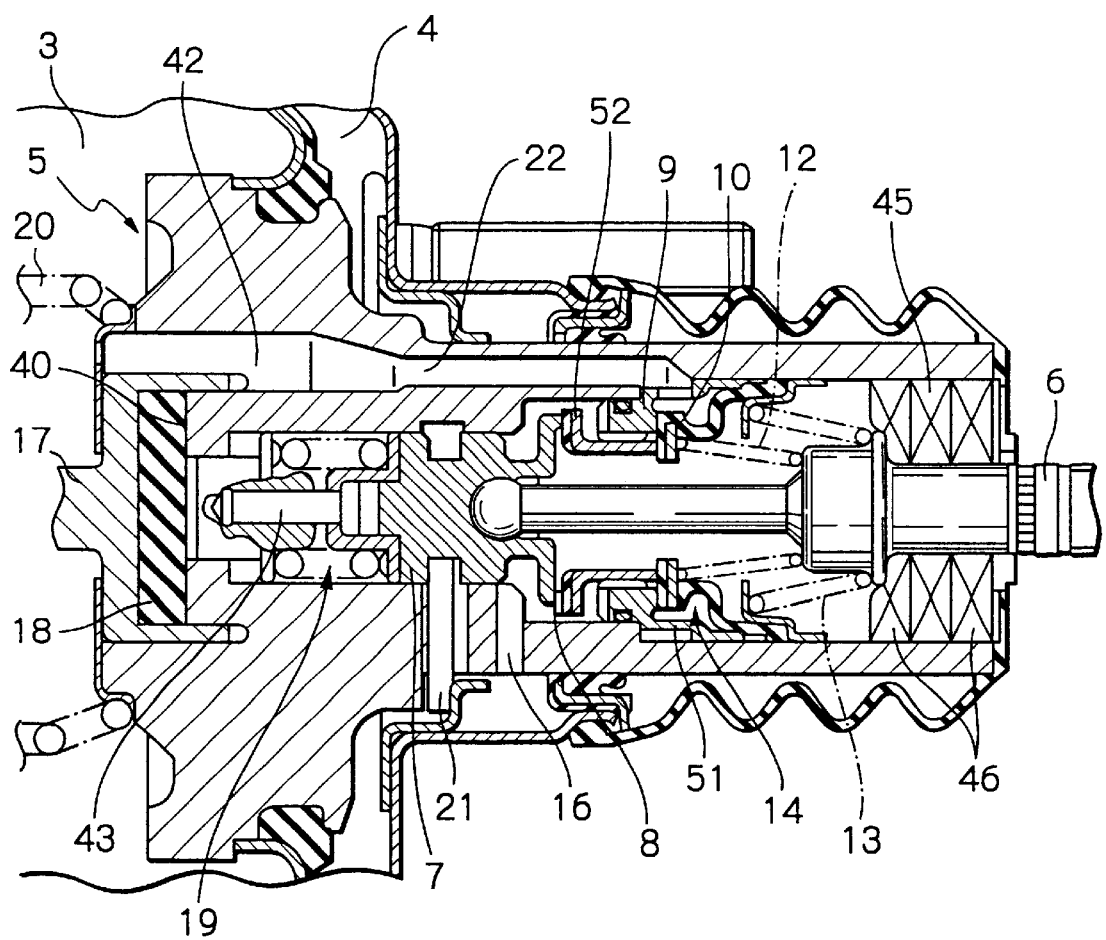
FIG. 1 is a cross-sectional view showing a structure of an essential part of a pneumatic booster according to an embodiment of the present invention.
Figure 2:
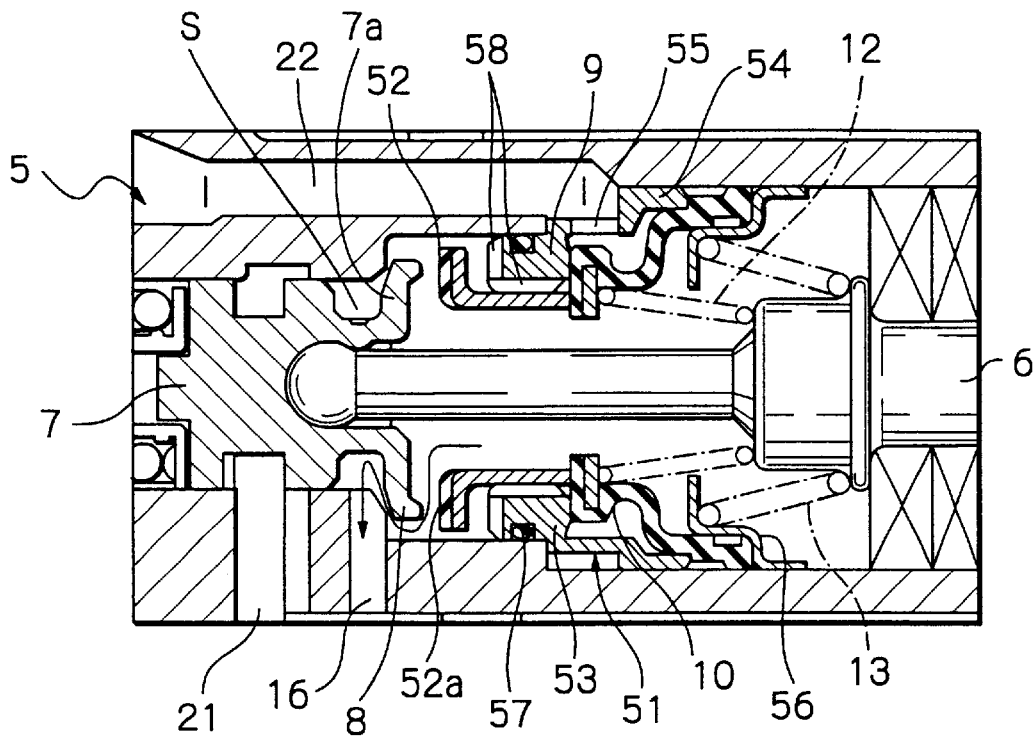
FIG. 2 is an enlarged cross-sectional view of the essential part of the pneumatic booster according to the embodiment of the present invention, showing how the pneumatic booster is operated.
Figure 3:
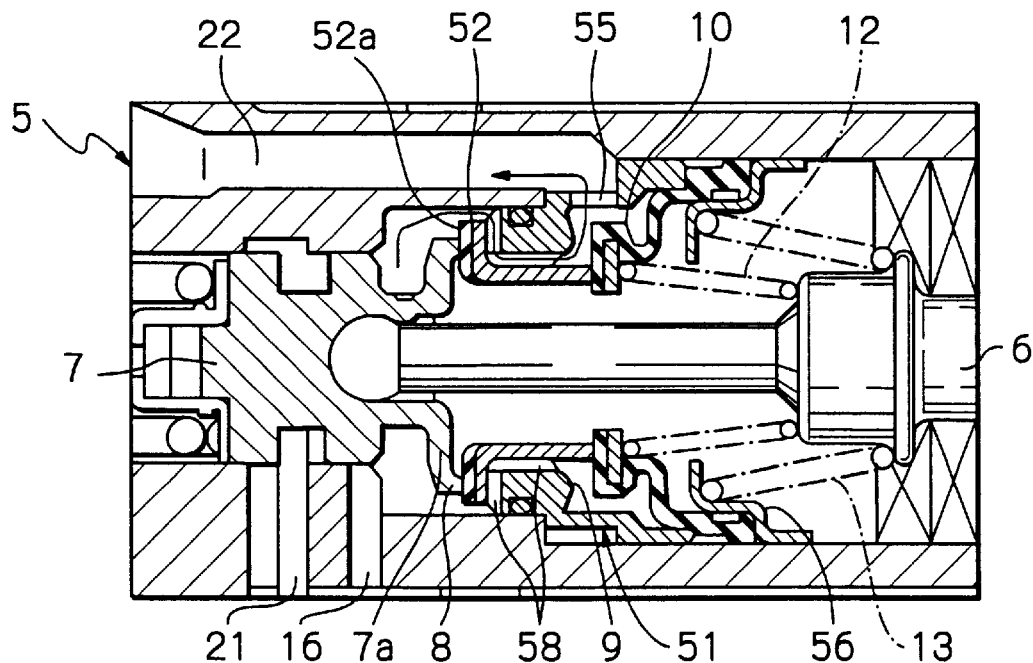
FIG. 3 is a cross-sectional view showing how the pneumatic booster according to the embodiment of the present invention is operated.

FIGS. 1 to 3 show a structure of a pneumatic booster according to an embodiment of the present invention. The general structure of the pneumatic booster of the present invention is the same as that of the pneumatic booster shown in FIGS. 4 and 5. Therefore, in FIGS. 1 to 3, the same parts or portions as shown in FIGS. 4 and 5 are designated by the same reference numerals and characters, and overlapping explanation thereof is omitted. In the present invention, the negative pressure valve seat 9, which is formed on the inner surface of the valve body 5 in the known pneumatic booster, is formed at an end portion of a cylindrical valve seat member 51 provided within the valve body 5. The atmospheric valve seat 8 of the plunger 7 has a larger diameter than that in the known pneumatic booster and is located in a position forward in a direction of propelling of the power piston 2 relative to the negative pressure valve member 9. The atmospheric valve seat 8 is positioned so as to substantially correspond to the negative pressure valve seat 9 in an axial direction. That is, the atmospheric valve seat 8 is positioned so as to radially overlap the negative pressure valve seat 9. Further, in the present invention, the poppet valve 10 in the known pneumatic booster is used as a main poppet valve, and a poppet valve mechanism including the main poppet valve and a sub poppet valve is provided. A sub poppet valve 52 is slidably provided within the valve seat member 51 so that a forward end seal surface 52a of the sub poppet valve 52 and a base end of the sub poppet valve 52 are adapted to abut against the atmospheric valve seat 8 and a seal surface of the main poppet valve 10, respectively. Therefore, as in the case of the atmospheric valve seat 8 of the plunger 7, the forward end seal surface 52a of the sub poppet valve 52 is located in a position forward in the direction of propelling of the power piston 2 relative to the negative pressure valve seat and is positioned so as to radially overlap the negative pressure valve seat 9. Therefore, the sub poppet valve 52 comprises a cylindrical body portion which slidably engages with and is guided by an inner circumferential surface of the valve seat member 51 so as to move in the axial direction and also comprises an annular flange portion having a larger diameter than the cylindrical body portion, which includes the forward end seal surface 52a. The valve seat member 51 is located in a position rearward in the direction of propelling of the power piston 2 relative to the forward end seal surface 52a.

The valve seat member 51 comprises a thick-walled cylinder portion 53 including the negative pressure valve seat 9 and a thin-walled cylinder portion 54 extending rearwardly from the thick-walled cylinder portion 53. The thin-walled cylinder portion 54 includes a through-hole 55 aligned with an open end of the axial passage 22 of the valve body 5. The valve seat member 51 has a stepped portion formed on an outer circumferential surface of the thick-walled cylinder portion 53. The valve seat member 51 is fixedly positioned by abutting the above-mentioned stepped portion against a stepped portion formed on an inner circumferential surface of the valve body 5 and fitting a rear end portion of the thin-walled cylinder portion 54 into a space between the main poppet valve 10 and the valve body 5. The main poppet valve 10 is pressed against the inner surface of the valve body 5 by a spring seat 56 which receives the return spring 13. Therefore, the thin-walled cylinder portion 54 of the valve seat member 51 is also pressed against the inner surface of the valve body 5 by the spring seat 56.

A space between the thick-walled cylinder portion 53 of the valve seat member 51 and the inner surface of the valve body 5 is sealed with a seal member 57. A plurality of grooves 58 are formed on an inner circumferential surface and an end surface of the thick-walled cylinder portion 53. The grooves on the inner circumferential surface of the thick-walled cylinder portion extend in the axial direction. The grooves 58 are used as an air flow passage. This flow passage is always open, regardless of the fitting position of the sub poppet valve 52 in the thick-walled cylinder portion 53.

In this embodiment, when the booster is inoperative, as shown in FIG. 1, the main poppet valve 10 is seated on the negative pressure valve seat 9 of the valve seat member 51, while the sub poppet valve 52 is seated on the atmospheric valve seat 8 of the plunger 7. In this instance, due to a large diameter of a flange portion of the plunger 7, at which the atmospheric valve seat 8 is formed, a large differential pressure is applied to the plunger 7. As a result of this differential pressure, a large pulling force $F_{PR}$ acts on the plunger 7 in the direction of the output shaft 17. When the brake pedal is depressed in this state, the input shaft 6 and the plunger 7 advance against the return force which is the resultant force of the set load $F_{BS}$ of the valve spring 12 and the set load $F_{RS}$ of the return spring 13, and the atmospheric valve seat 8 of the plunger 7 is moved away from the seat surface 52a of the sub poppet valve 52, to thereby open the atmospheric valve. Consequently, as shown in FIG. 2, atmospheric air which has flowed into the valve body 5 through a silencer 45 and filters 46 flows through a gap between the atmospheric valve seat 8 and the sub poppet valve 52. The atmospheric air further flows into a space S on the back side of the flange 7a of the plunger 7 and flows into the variable-pressure chamber 4 through the radial passage 16 of the valve body 5, to thereby generate the differential pressure between the constant-pressure chamber 3 supplied with the negative pressure and the variable-pressure chamber 4.

Thus, due to the action of the large pulling force $F_{PR}$ on the plunger 7, the resistance thrust force ($=F_{BS}+F_{RS}-F_{PR}$), which is generated in accordance with depressing of the brake pedal, can be reduced to a level as low as possible. Therefore, smooth brake operation can be achieved, even when the pedal ratio is small. Further, in this embodiment, a sufficient flow path area is ensured (FIG. 2) around the atmospheric valve seat 8. Therefore, in accordance with advancement of the plunger 7, a large amount of atmospheric air is introduced into the variable-pressure chamber 4 in a short period of time. Consequently, a large differential pressure is generated rapidly between the constant-pressure chamber 3 and the variable-pressure chamber 4, to thereby propel the power piston 2. The force by which the power piston 2 is propelled is transmitted through the valve body 5 to the output shaft 17. Thus, a boosting action is produced without any delay in operation.

When the depressing force on the brake pedal is removed, the input shaft 6 and the plunger 7 retract as a unit due to the force of the return spring 13 of the valve mechanism 14. As shown in FIG. 3, the atmospheric valve seat 8 abuts against the seal surface 52a of the sub poppet valve 52. On the other hand, the main poppet valve 10 receives a return force through the sub poppet valve 52, so that the main poppet valve 10 moves away from the negative pressure valve seat 9 of the valve seat member 51, to thereby open the negative pressure valve. Consequently, the negative pressure in the constant-pressure chamber 3 is fed from the axial passage 22 of the valve body 5 through the through-hole 55 of the valve seat member 51 and the grooves 58 of the valve seat member 51 to the back side of the atmospheric valve seat 8 of the plunger 7. Further, the negative pressure is fed through the radial passage 16 of the valve body 5 to the variable-pressure chamber 4, so that the above-mentioned differential pressure is removed. When the plunger 7 retracts, a sufficient flow path area is ensured between the main poppet valve 10 and the negative pressure valve seat 9 of the valve seat member 51. Therefore, the negative pressure is introduced into the variable-pressure chamber 4 in a short period of time, in accordance with the retraction of the plunger 7. That is, due to the introduction of the negative pressure into the variable-pressure chamber 4 in a short period of time and the force of the return spring 20, the power piston 2 and the valve body 5 return to the inoperative state shown in FIG. 1 without any delay.

Further, in this embodiment, the main poppet valve 10, the negative pressure valve seat 9 of the valve seat member 51, the seal surface 52a of the sub poppet valve 52 and the atmospheric valve seat 8 of the plunger 7 are arranged in series in this order in the direction of propelling of the power piston 2.

Therefore, in this embodiment, the atmospheric valve, which is opened and closed by moving the atmospheric valve seat 8 of the plunger 7 to and away from the seal surface 52a of the sub poppet valve 52, is located in a position forward in the direction of propelling of the power piston 2 relative to the negative pressure valve, which is opened and closed by moving the main poppet valve 10 to and away from the negative pressure valve seat 9 of the seat valve member 51.

Consequently, the outer diameter of each of the atmospheric valve seat 8 of the plunger 7 and the seal surface 52a of the sub poppet valve 52 is not limited by the inner diameter of each of the main poppet valve 10 and the negative pressure valve seat 9 of the valve seat member 51. Therefore, the diameter of the atmospheric valve seat 8 of the plunger 7 can be increased to a level as high as possible.

Further, in this embodiment, in addition to the above arrangement, the valve seat member 51 including the negative pressure valve seat 9 is formed from a member separate from the valve body 5.

The valve seat member 51 is fitted into the valve body 5 from a rear end portion of the valve body. The negative pressure valve seat 9 is formed at an end portion of the valve seat member 51 on a side of the rear end portion of the valve body 5.

By this arrangement, even when the diameter of the atmospheric valve seat 8 is increased to a level greater than the inner diameter of the cylindrical valve seat member 51, the plunger 7, the sub poppet valve 52, the valve seat member 51 and the main poppet valve 10 can be mounted in the valve body 5 in this order from the rear end portion of the valve body 5. Therefore, even when the diameter of the atmospheric valve seat 8 is large, the mounting of the above-mentioned members is not interfered with. Further, the sub poppet valve 52 can be held by the cylindrical valve seat member 51 after it is slidably fitted into the cylindrical valve seat member 51. Therefore, without the need to preliminarily fix the sub poppet valve 52 to the main poppet valve 10 upon assembly, they can be used as a unit. Therefore, a mounting operation is made easy.

As has been described above, in the pneumatic booster of the present invention, the resistance thrust force at the time of depressing the brake pedal can be reduced. Therefore, even when the pedal ratio is made small in accordance with an increase in the stroke in each of the master cylinder and the booster, no lowering of brake operability occurs. Therefore, the pneumatic booster of the present invention can be used in a wide range of applications, thus markedly contributing to a reduction in size of brake systems.

What is claimed is:

1. A pneumatic booster comprising:

a shell body;

a power piston which divides an interior of the shell body into a constant-pressure chamber and a variable-pressure chamber;

a valve body supported by the power piston;

an output shaft connected to the valve body; and a valve mechanism provided within the valve body, the valve mechanism including:

a plunger connected to an input shaft to be connected to a brake pedal;

a poppet valve mechanism including a seal surface capable of abutting against an annular atmospheric valve seat and a seal surface capable of abutting against an annular negative pressure valve seat, the atmospheric valve seat being provided at an end portion of the plunger, which end portion is connected to the input shaft, and the negative pressure valve seat being formed on an inner surface of the valve body, the poppet valve mechanism further including a main poppet valve, the main poppet valve including the seal surface capable of abutting against the negative pressure valve seat;

a valve spring having one end engaged with the input shaft, the valve spring normally biasing the poppet valve mechanism in a direction for enabling the poppet valve mechanism to be seated on the respective valve seats; and a return spring having one end engaged with the valve body, the return spring normally biasing the input shaft in a return direction;

the valve mechanism being adapted to introduce atmospheric air into the variable-pressure chamber in accordance with movement of the plunger, propel the power piston due to differential pressure generated between the variable-pressure chamber and the constant-pressure chamber and transmit force by which the power piston is propelled through the valve body to the output shaft, wherein the annular atmospheric valve seat of the plunger is located in a position forward in a direction of propelling of the power piston relative to the negative pressure valve seat and is positioned so as to substantially correspond to the negative pressure valve seat in an axial direction and wherein the poppet valve mechanism further includes a sub poppet valve, the sub poppet valve including the seal surface capable of abutting against the atmospheric valve seat, the seal surface of the sub poppet valve being spaced apart in the axial direction from the seal surface of the main poppet valve; and wherein the negative pressure valve seat is formed on a cylindrical valve seat member formed as a separate member from the valve body, the valve seat member including an axial groove formed on an inner circumferential surface thereof, and wherein the sub poppet valve comprises a cylindrical body portion which is guided by the inner circumferential surface of the valve seat member so as to move in the axial direction and an annular flange portion extending radially outward of the body portion, the seal surface of the sub poppet valve being formed on the flange portion.

2. A pneumatic booster according to claim 1, wherein the sub poppet valve is a member separate from the main poppet valve.

3. A pneumatic booster according to claim 1, wherein the seal surface of the main poppet valve extends radially inward to a position at which the seal surface of the main poppet valve is capable of engaging with an end portion of the cylindrical body portion of the sub poppet valve.

4. A pneumatic booster according to claim 1, wherein the valve seat member includes a radial groove at an end portion thereof which portion faces the annular flange portion of the sub poppet valve.

* * * * *